United States Patent
Boyd et al.

(10) Patent No.: US 8,515,728 B2
(45) Date of Patent: Aug. 20, 2013

(54) LANGUAGE TRANSLATION OF VISUAL AND AUDIO INPUT

(75) Inventors: Jonathan J. Boyd, Redmond, WA (US); Binay K. Pathak, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 11/731,282

(22) Filed: Mar. 29, 2007

(65) Prior Publication Data
US 2008/0243473 A1 Oct. 2, 2008

(51) Int. Cl.
*G06F 17/28* (2006.01)

(52) U.S. Cl.
USPC ............... 704/2; 704/3; 704/4; 704/5; 704/7; 704/8; 715/264

(58) Field of Classification Search
USPC .......................... 704/2–8, 231, 251; 715/264
See application file for complete search history.

(56) References Cited

U.S. PATENT DOCUMENTS

| | | | |
|---|---|---|---|
| 5,268,839 A | 12/1993 | Kaji | |
| 5,799,276 A * | 8/1998 | Komissarchik et al. | 704/251 |
| 5,956,681 A | 9/1999 | Yamakita | |
| 6,385,586 B1 | 5/2002 | Dietz | |
| 6,393,403 B1 | 5/2002 | Majaniemi | |
| 6,499,016 B1 * | 12/2002 | Anderson | 704/275 |
| 6,532,446 B1 | 3/2003 | King | |
| 6,907,256 B2 | 6/2005 | Hokao | |
| 6,917,917 B1 | 7/2005 | Kim | |
| 6,931,463 B2 | 8/2005 | Striemer | |
| 7,035,804 B2 * | 4/2006 | Saindon et al. | 704/271 |
| 7,130,801 B2 | 10/2006 | Kitahara et al. | |
| 7,853,444 B2 * | 12/2010 | Wang et al. | 704/2 |
| 2001/0029455 A1 | 10/2001 | Chin et al. | |
| 2001/0032070 A1 * | 10/2001 | Teicher | 704/2 |
| 2003/0200078 A1 * | 10/2003 | Luo et al. | 704/2 |
| 2004/0102957 A1 | 5/2004 | Levin | |
| 2004/0167770 A1 | 8/2004 | Zhuo et al. | |
| 2004/0210444 A1 * | 10/2004 | Arenburg et al. | 704/277 |
| 2004/0249629 A1 * | 12/2004 | Webster | 704/4 |
| 2005/0154589 A1 * | 7/2005 | Nishitani et al. | 704/256 |
| 2005/0197825 A1 * | 9/2005 | Hagerman et al. | 704/2 |
| 2006/0136207 A1 * | 6/2006 | Kim et al. | 704/249 |
| 2006/0248071 A1 * | 11/2006 | Campbell et al. | 707/5 |
| 2007/0219777 A1 * | 9/2007 | Chu et al. | 704/9 |

(Continued)

OTHER PUBLICATIONS

Alex Waibel, "Interactive Translation of Conversational Speech", Date: Jul. 1996, pp. 41-48, vol. 29, Issue 7, http://ieeexplore.ieee.org/iel1/2/11070/00511967.pdf? tp=&arnumber=511967&isnumber=11070.

(Continued)

*Primary Examiner* — Lamont Spooner
(74) *Attorney, Agent, or Firm* — Microsoft Corporation (57) ABSTRACT

The present translation system translates visual input and/or audio input from one language into another language. Some implementations incorporate a context-based translation that uses information obtained from visual input or audio input to aid in the translation of the other input. Other implementations combine the visual and audio translation. The translation system includes visual components and/or audio components. The visual components analyze visual input to identify a textual element and translate the textual element into a translated textual element. The visual image represents a captured image of a target scene. The visual components may further substitute the translated textual element for the textual element in the captured image. The audio components convert audio input into translated audio.

20 Claims, 5 Drawing Sheets

(56) References Cited

U.S. PATENT DOCUMENTS

| | | | |
|---|---|---|---|
| 2007/0293272 A1* | 12/2007 | Salmon | 455/566 |
| 2008/0221862 A1* | 9/2008 | Guo et al. | 704/2 |
| 2008/0233980 A1* | 9/2008 | Englund et al. | 455/466 |

OTHER PUBLICATIONS

Wolfgang Wahlster, et al., "Mobile Speech-to-Speech Translation of Spontaneous Dialogs: An OverView of the Final Verbmobil System", Date Jul. 2000, p. 3-21, http://www.dfki.de/~wahlster/Publications/Mobile Speech to Speech Translation of Spontaneous Dialogs.pdf.

Zhou, et al., "A Hand-Held Speech-To-Speech Translation System", Date: 2003; pp. 664-669, http://ieeexplore.ieee.org/iel5/9212/29213/01318519.pdf?isnumber=&arnumber=1318519.

Zhou, et al., "Two-Way Speech-to-Speech Translation on Handheld Devices", http://perso.limsi.fr/dechelot/pub/Zhou_Dechelotte_ICSLP04.pdf, 2004.

* cited by examiner

LANGUAGE TRANSLATION OF VISUAL AND AUDIO INPUT

BACKGROUND

Many times, tourists in a foreign country have difficulty reading signs and understanding spoken communications in the foreign country. These tourists may be able to use a translation device that allows them to type or speak a word in one language and have the translation device either display or speak a corresponding translated word in a language that the tourists understand. While these types of translation devices work, they are not ideal.

SUMMARY

Described herein are various technologies and techniques for translating visual and/or audio input from one language to another. Some implementations incorporate a context-based translation that uses information obtained from visual input or audio input to aid in the translation of the other input. Other implementations combine the visual and audio translation. The visual translation includes analyzing the visual input to identify a textual element. The textual element is translated into a translated textual element based on a visual input language and a visual output language. The translated textual element may be overlaid on an image, used to provide a contextual hint for the translation of the audio input, and/or converted to audio.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many of the attendant advantages of the present translation system and technique will become more readily appreciated as the same becomes better understood with reference to the following detailed description. A brief description of each drawing is described below.

DETAILED DESCRIPTION

The following discussion first describes an operating environment in which a translation system may operate. Next, the discussion focuses on translation components suitable for use within the translation system. The discussion then describes example processes suitable for implementing the translation components. Lastly, the discussion describes one possible configuration for a translation device.

However, before describing the above items, it is important to note that various embodiments are described fully below with reference to the accompanying drawings, which form a part hereof, and which show specific implementations for practicing various embodiments. However, other embodiments may be implemented in many different forms and should not be construed as limited to the embodiments set forth herein; rather, these embodiments are provided so that this disclosure will be thorough and complete. Embodiments may take the form of a hardware implementation, a software implementation executable by a computing device, or an implementation combining software and hardware aspects. The following detailed description is, therefore, not to be taken in a limiting sense.

In various embodiments, the logical operations may be implemented (1) as a sequence of computer implemented steps running on a computing device and/or (2) as interconnected machine modules (i.e., components) within the computing device. The implementation is a matter of choice dependent on the performance requirements of the computing device implementing the embodiment. Accordingly, the logical operations making up the embodiments described herein are referred to alternatively as operations, steps, or modules.

Operating Environment for a Translation System

Figure 1:
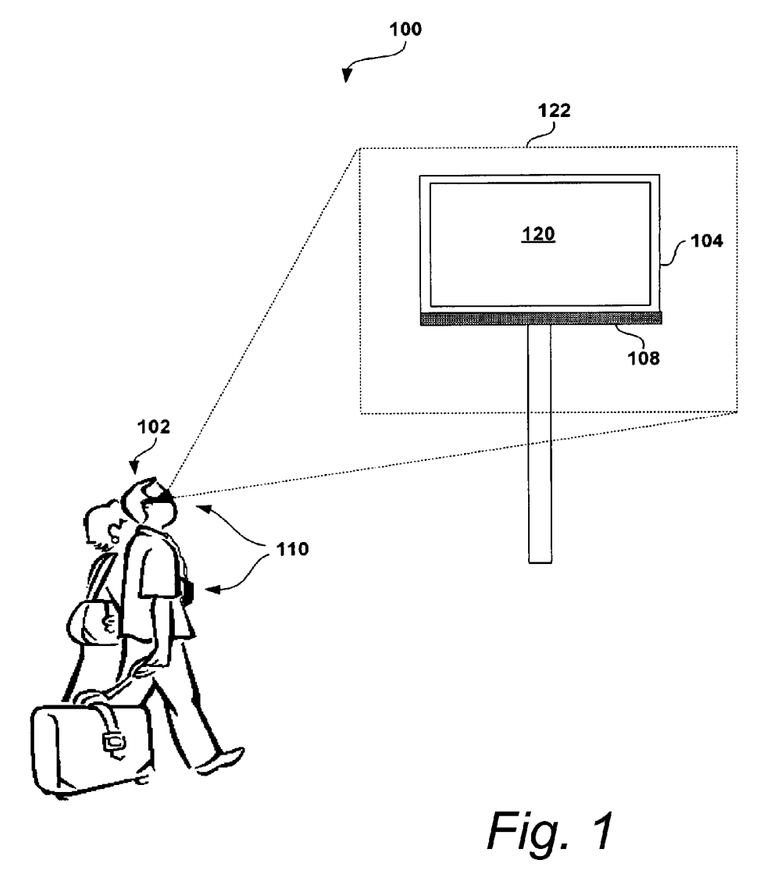
FIG. 1 is a graphical illustration of one example of an operating environment in which a translation system may be utilized.

FIG. 1 is a graphical illustration of an example of an operating environment 100 in which a translation system may be utilized. In this example, a person 102 is shown who is visiting a foreign country. While sightseeing, the person may encounter a sign (e.g., sign 104) written in a foreign language and may interact with one or more individuals (not shown) who communicate with the person in the same foreign language or in different foreign languages. Typically, the person can identify the unfamiliar language written on the signs by knowing the country in which the signs are located. However, the person may be unable to identify the unfamiliar spoken language because the individuals may not be speaking the native language of the country in which the person is traveling. In another variation, the spoken communication may be a recorded message played via a speaker 108.

Figure 2:
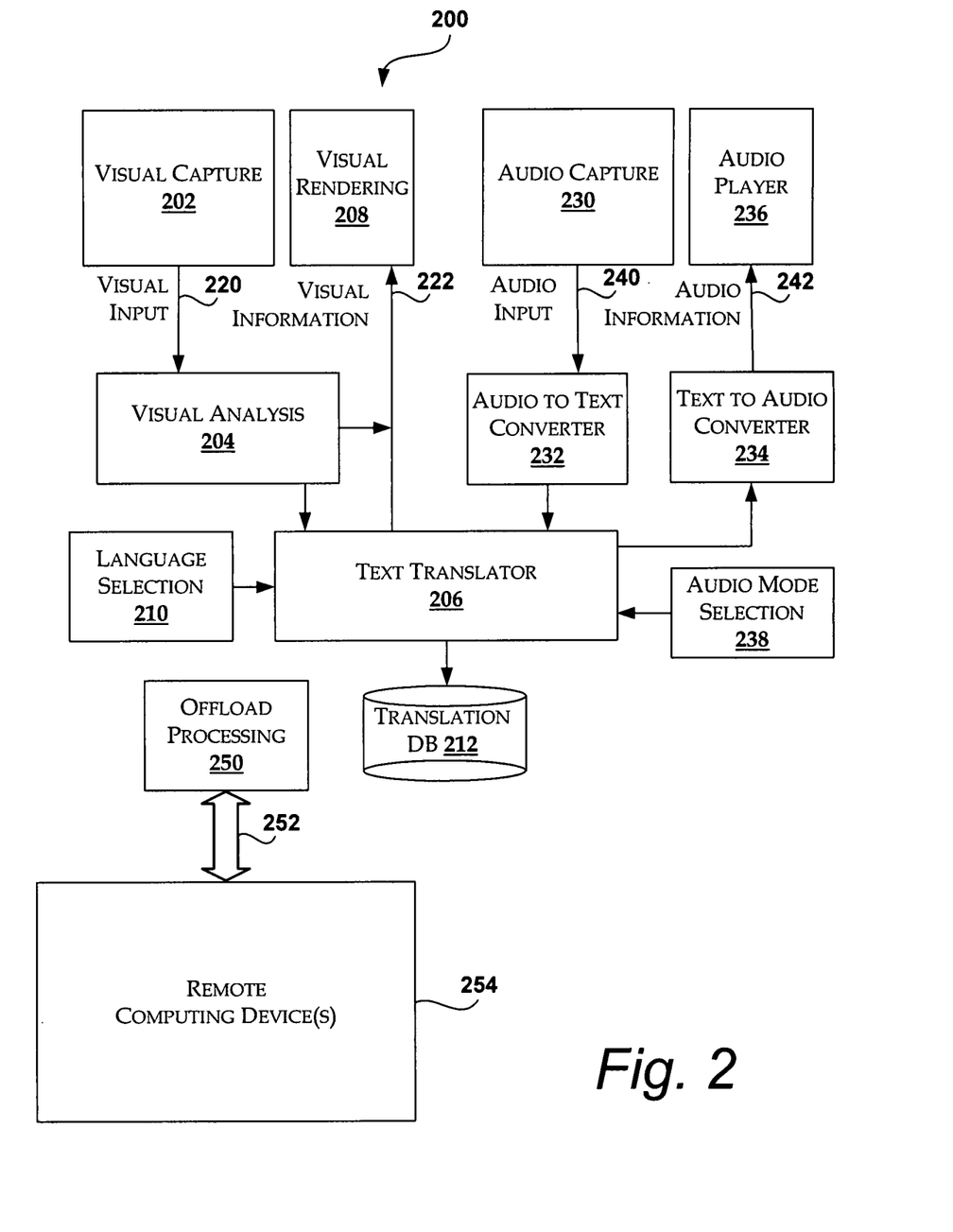
FIG. 2 illustrates one example configuration of translation components suitable for use within a translation system.

In order for this person 102 to "interact" and "visually experience" the foreign country as if in the person's native country or in another chosen familiar country, the person 102 may utilize a visual and audio translation system 110. Hereinafter, for convenience, the term "translation system" may be used interchangeably with the term "visual and audio translation system". Briefly, the translation system 110, described functionally in further detail in conjunction with FIG. 2, is configured to identify a textual element 120 within visual input (not shown), translate the textual element into a translated textual element of a specified language, and displays the translated textual element at a location corresponding to the original text as seen by person 102. Visual input represents a captured image of a target scene 122. Thus, the translation system creates an alternate visual experience where foreign text is replaced with translated text based on a specified visual input and output language. The specified languages may be selectable via a mechanism within the translation system, such as a drop down menu or the like.

Similarly, the translation system 110 may be configured to receive an audio input, translate the audio input into translated audio input in the specified language, and then output the translated audio input in a manner that allows the person 102 to hear the audio communication as if the audio communication had been initially spoken in the specified language.

In another variation, the translated textual element may be provided as audio to person 102. This allows visual input to supplement audio communication. This may be particular useful if the vision of person 102 is not 20/20, such as if person 102 misplaced a corrective pair of glasses, if person 102 is blind, or the like.

While FIG. 1 illustrates one example of an operating environment in which the present translation system may operate, the translation system is envisioned to operate within various other operating environments. Some of these operating environments may be for single users, as shown in FIG. 1, and other operating environments may be for multiple users. Multiple users may use separate translation systems to experience a current event. Each person may interact and visually experience the event based on their respective specified input/output languages. For example, assuming the event is an international convention where multiple people present topics in a variety of languages. Each participant at the international convention may utilize their own translation system to view presentations and hear audio on the topics in their respective chosen language. Thus, multiple people in various languages may understand one presentation.

It is also envisioned that the translation system may be utilized in a teaching environment to learn a new language. In the teaching environment, the signs and verbal communication may be in a person's native language and the translation system may convert the native language into a selected unfamiliar foreign language that is being studied and/or learned. In addition, the translation system is envisioned to operate in academic, business, military, and other operating environments to allow people to interact and visually experience an alternative experience based on their specified language.

Components for a Translation System

FIG. 2 illustrates one example configuration of translation components 200 suitable for use within a translation system. Example processing performed by these components is described below in conjunction with FIGS. 3 and 4. In the embodiment shown, the translation components 200 include components for visual translation and components for audio translation. The visual translation components include a visual capture component 202, a visual analysis component 204, a text translator component 206, a visual rendering component 208, and a language selection component 210.

The visual capture component 202 is configured to capture a visual input 220 in some manner. The visual input may originate from a target scene viewed by a person, streaming video, already captured video, or other types of visual input that can be captured. The visual capture component 202 may capture the visual input 220 in a number of ways, such as by utilizing well known digital camera technology or the like. The visual input 220 captured by the visual capture component is transmitted to the visual analysis component 204. The visual analysis component is configured to analyze the visual input to determine locations within the visual input that contain textual elements. Once one or more locations of textual elements are identified, the textual element is provided to a text translator component 206. In addition, the locations may be provided to the visual rendering component 208.

The text translator component 206 is configured to convert the text into translated text based on an output language specified via the language selection component 210. The language selection component 210 also includes a visual input language selection for specifying the language associated with the textual element in the visual input and an audio input language selection for specifying an audio input language associated with audio being heard. The language selection component may default the audio input language to the visual input language once the audio input language is specified and vice versa. In another implementation, the language selection component may include logic for automatically determining the visual input language and/or audio input language. The text translator component may utilize a translation database 212 or other mechanism for translating the original text into the translated text. Visual information 222 that includes the translated text and a corresponding location for the translated text within the visual input may be transmitted to a visual rendering component 208. The visual rendering component 208 is configured to receive the visual information and to render an image having the translated text in place of the original text at the corresponding location. For example, the visual rendering component 208 may overlay the translated text onto a display displaying the original visual input at a location provided in the visual information 222.

The audio translation components include an audio capture component 230, an audio to text converter component 232, a text to audio converter component 234, and an audio player component 236. The audio capture component 230 is configured to capture audio input 240. The audio capture component 230 may be manually controlled, voice-activated, or the like. In addition, the audio capture component 230 may be configured to segment the captured audio into audio segments based on pauses within the audio, based on a specified number of syllables within the audio, or the like. There may be one or more audio segments. Each audio segment is transmitted as audio input 240 to the audio to text converter component 232. The audio to text converter component 232 is configured to convert each audio segment into text segments. The text segments are then transmitted to the text translator component 206 where the text is translated into translated text according to the specified language. The translated text is then transmitted to a text to audio converter component 234 that is configured to output audio information 242 corresponding to the translated text. The audio information 242 may then be played by the audio player component 236 in order to hear the translation of the audio input.

One will note that the text translated from the visual input may also be sent to the text to audio converter 234 for playback by the audio player 236. An audio mode selection 238 may be provided to determine whether the audio player 236 plays back the translated audio from the audio input and/or the translated text from the visual input. In addition, one will note that text translator may receive the textual elements from the visual analysis 204 and the text segments from the audio to text converter 232. By having both the textual elements and the text segments, text translator 206 may utilize one to provide contextual hints for the other.

The functional components illustrated in FIG. 2 may also include an optional offload processing component 250. The offload processing component 250 monitors central processing unit (CPU) usage. When the CPU usage is higher than a pre-determined value, the offload processing component transmits the visual input and/or the audio input to a remote computing device 254 via a network 252. For this embodiment, the remote computing device includes the necessary translation components 200 to convert the visual and/or audio input to the associated visual information and/or audio information. The network may be a wide area network, a telephone network, a wireless network, or any other type of network or communication channel via which the visual input and/or audio input may be communicated. In addition, multiple remote computing devices may be used to perform the visual and/or audio translations. The resulting visual information and/or audio information may be sent back to a mobile device that is configured to render the translated visual information and/or play the translated audio information for a user.

FIG. 2 illustrates one possible arrangement of the translation components suitable for implementing a translation system. One skilled in the art will appreciate that any one of the components may perform processing steps performed by one of the other components. In addition, additional components may be added to support the described processing steps. Thus, there may be numerous configurations for the translation components.

Example Processes Suitable for Implementing the Components

The following flow diagrams provide example processes that may be used to implement the translation components shown in FIG. 2. The order of operations in these flow diagrams may be different from described and may include additional processing than shown. In addition, not all of the processing shown in the flow diagrams needs to be performed to implement one embodiment of the translation system.

Figure 3:
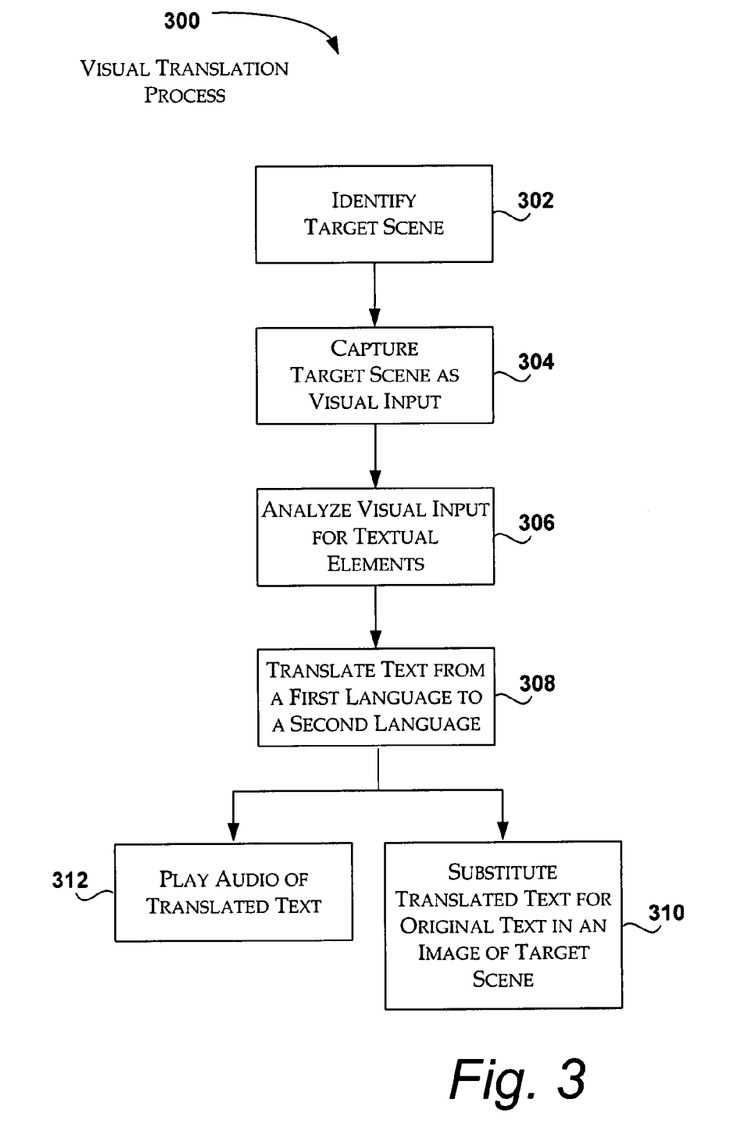
FIG. 3 is a flow diagram illustrating one example of a visual translation process suitable for use in the processing performed by one or more of the translation components shown in FIG. 2.

FIG. 3 is a flow diagram illustrating one embodiment of a visual translation process suitable for use in the processing performed by one or more of the translation components shown in FIG. 2. The visual translation process 300 begins at block 302 where a target scene is identified. The identification of the target scene may be performed by positioning a data capture device in the direction of the target scene or by any other mechanism whereby a target scene is identified. Processing continues at block 304.

At block 304, the target scene is captured as visual input. Capturing the target scene may be performed by taking a picture using well-known digital camera technologies or by using any other mechanism whereby the target scene is captured as visual input. Processing continues at block 306.

At block 306, the visual input is analyzed to determine one or more locations that contain text (i.e., textual elements). The analysis may be performed using well-known techniques, such as neural network based optical character recognition (OCR). Processing continues at block 308.

At block 308, for each textual element, the corresponding text is translated into a specified output language. The translation of the text may be performed using well-known translation techniques using a translation database that contains translations of words to and from several languages. Processing continues optionally at block 310 and/or block 312.

At block 310, the translated text is displayed on an image along with the visual input of the target scene. Displaying the translated text may include overlaying translated text on a display at a location corresponding to the original text in the visual input. For example, if the display is a pair of goggles worn by a user, the translated text may overlay the original text in a manner such that the user now "sees" the text in the target scene based on the specified visual output language. The translated text may also be displayed in other areas of the display with or without an association to the original text. For example, the translated text may appear on the bottom of the display with or without the original text.

At block 312, the translated text may be played back as audio. As mentioned above, an audio mode selection may be provided that allows the translated text from the visual input and/or the translated text from the audio input to be played back as audio.

Figure 4:
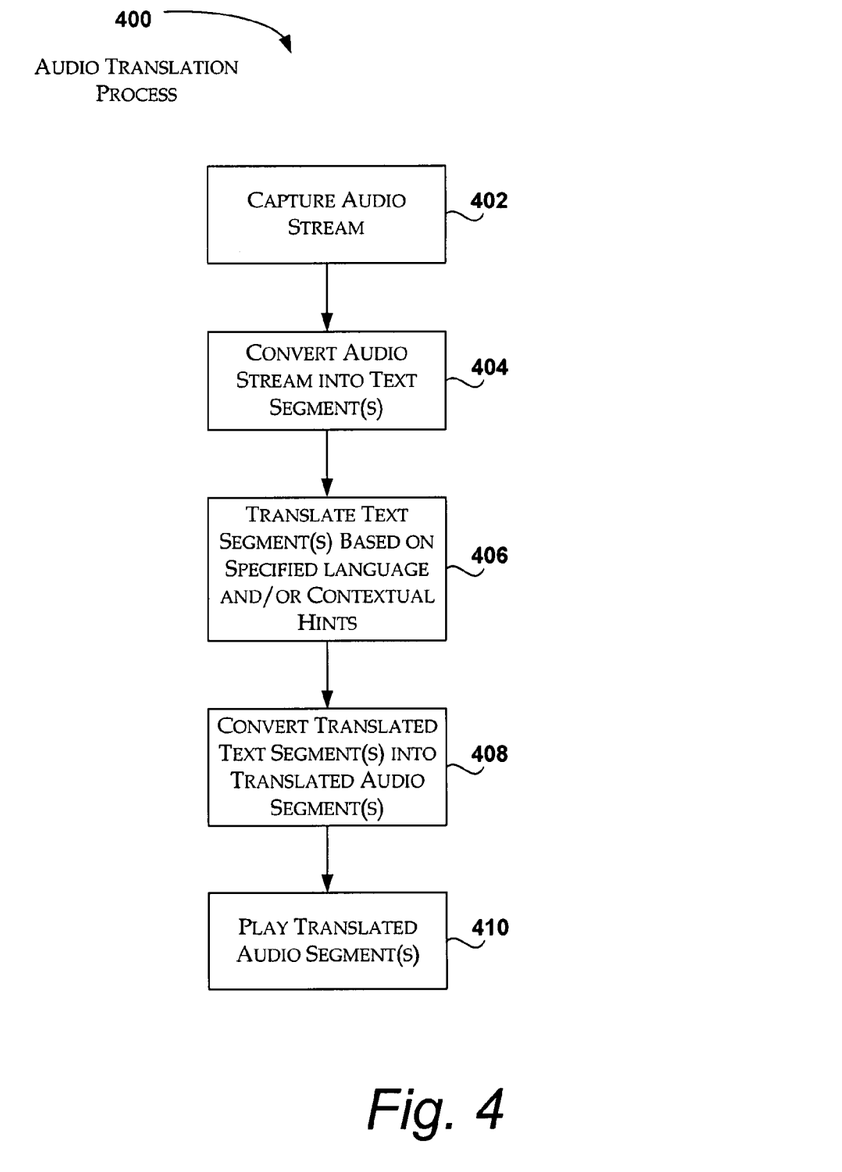
FIG. 4 is a flow diagram illustrating one example of an audio translation process suitable for use in the processing performed by one or more of the translation components shown in FIG. 2.

FIG. 4 is a flow diagram illustrating one example of an audio translation process suitable for use in the processing performed by one or more of the translation components shown in FIG. 2. The audio translation process 400 begins at block 402 where an audio stream is captured. The audio stream may be automatically captured based on voice activation, may be captured manually by depressing a button on an audio device, or the like. Capturing the audio stream may be implemented by one of several well known techniques, such as digital sound recording. Processing continues at block 404.

At block 404, the captured audio is converted into one or more text segments. The conversion may divide the captured audio into the text segments based on pauses within the recorded audio, based on sentence structure of the recorded audio, or based on other criteria. Segmenting the captured audio into text segments may be implemented by one of several well known techniques, such as speech recognition using neural networks. Processing continues at block 406.

At block 406, each text segment is translated into an audio output language that results in translated text segments. This translation may be performed using various translation techniques that use a translation database that contains translations of words to and from several languages. In addition, the translation may utilize contextual hints obtained from the textual elements in the visual input. Processing continues at block 408.

At block 408, each translated text segment is converted into a translated audio segment. Translating the text segment into the audio segment may be implemented by one of several well known techniques, such as hidden Markov model (HMM)-based speech synthesis. Processing continues at block 410.

At block 410, the translated audio segments may be played through an audio device to hear the translated text. Processing for the audio translation process is then complete.

While several of the steps in FIGS. 3 and 4 identify possible well known techniques that could be used for implementing the step, one skilled in the art will appreciate that the visual and/or audio translation processes are not limited to using only the above listed techniques. In another variation, process 300 and/or process 400 may store the translated text and translated audio for later playback, respectively. In yet another variation, process 300 and/or process 400 may store the visual input and the audio input, respectively, and then later perform the subsequent steps on the input. These and other variations of processes 300 and 400 are envisioned.

One Embodiment for a Translation Device

Figure 5:
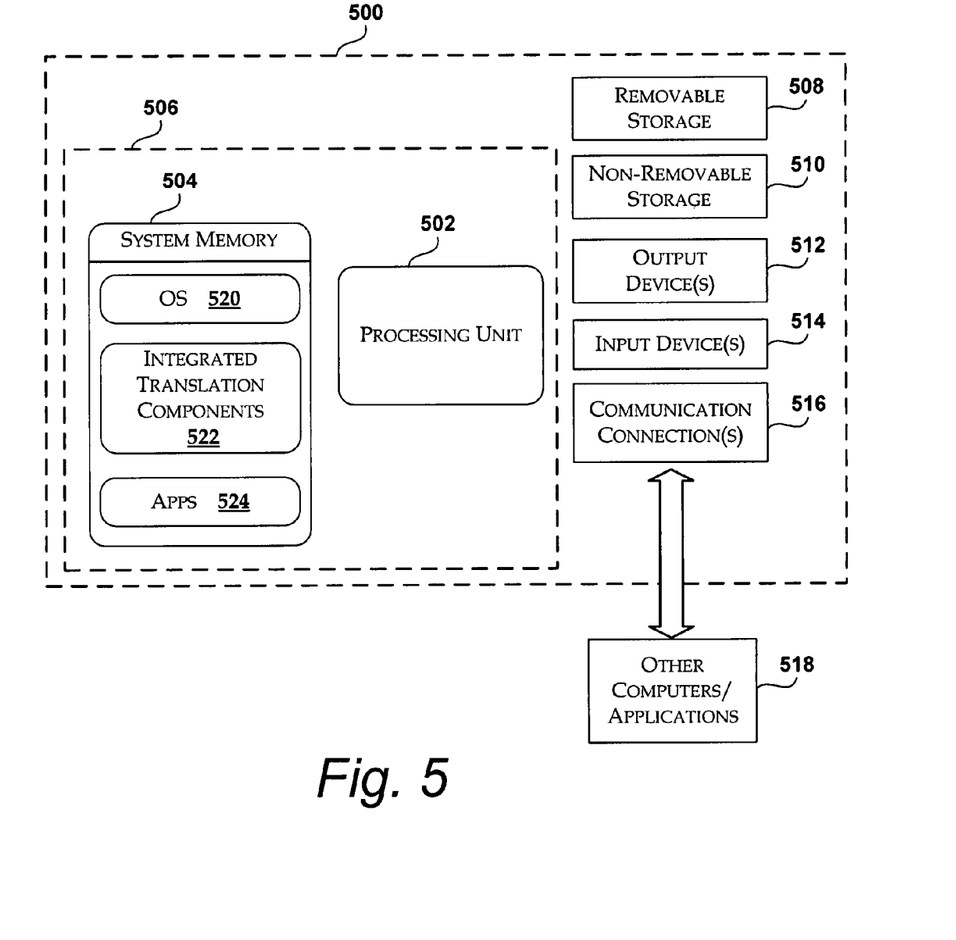
FIG. 5 is a functional block diagram of a translation device that may implement one or more of the translation components shown in FIG. 2.

FIG. 5 is a functional block diagram of a translation device 500 that may implement one or more of the translation components shown in FIG. 2. For example, in one embodiment, the translation device may not include the visual capture component 202 and the visual rendering component 208. In this embodiment, a separate visual device may cooperate with the translation device to achieve the functionality of the translation system. The separate visual device may be any well-known device for capturing visual input, such as a digital camera, a video recorder, or the like. The separate visual device may also be a pair of goggles configured to capture and render "translated" scenes on a display through which a user views the surroundings. Similarly, a separate audio device may cooperate with the translation device to achieve the functionality of the translation system. The translation device, for this embodiment, may not include the audio capture component 230 and/or one of the other audio components.

The following describes one possible basic configuration for the translation device 500. The translation device includes at least a processing unit 502 and memory 504. Depending on the exact configuration and type of computing device, memory 504 may be volatile (such as RAM), non-volatile (such as ROM, flash memory, etc.) or some combination of the two. System memory 504 typically includes an operating system 520, one or more applications 524, and may include program data (not shown). Memory 504 also includes one or more of the translation components 522. This basic configuration is illustrated in FIG. 5 by dashed line 506.

Additionally, translation device 500 may also have other features and functionality. For example, translation device 500 may also include additional storage (removable and/or non-removable) including, but not limited to, magnetic or optical disks or tape. Such additional storage is illustrated in FIG. 5 by removable storage 508 and non-removable storage 510. Computer-readable storage media includes volatile and nonvolatile, removable and non-removable media implemented in any method or technology for storage of information such as computer readable instructions, data structures, program modules or other data. Memory 504, removable storage 508, and non-removable storage 510 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by translation device 500. Any such computer storage media may be part of translation device 500.

Translation device 500 may also include one or more communication connections 516 that allow the translation device 500 to communicate with one or more computers and/or applications 518. As discussed above, communication connections may be utilized to offload processing from the translation device to one or more remote computers. Device 500 may also have input device(s) 512 such as keyboard, mouse, pen, voice input device, touch input device, etc. Output device(s) 512 such as a speaker, printer, monitor, and other types of digital display devices may also be included. These devices are well known in the art and need not be discussed at length here.

The translation device 500 may be a mobile device, a kiosk-type device, or the like. When the translation device 500 comprises a kiosk-type device, the visual input may take the form of a digital picture. The digital picture may be a printed picture that is scanned, a file in various formats, or the like. The kiosk-type device may manipulate the digital picture by replacing the original text with the translated text.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Glasses configured to translate, comprising:
    a language selection component configured to determine at least one of a first language or a second language based at least in part on at least one of a selection by a user or a logic for automatically determining a language;
    a visual capture component configured to receive visual input of a target scene, the visual input originating from at least one of streaming video or captured video;
    a visual analysis component configured to analyze, using neural network based optical character recognition, the visual input to identify one or more locations within the visual input that comprise a textual element associated with the first language;
    a text translator component configured to translate the textual element into a translated textual element associated with the second language based at least in part on a first contextual hint determined based at least in part on an audio input associated with the first language;
    a visual rendering component configured to:
        at least one of substitute the translated textual element for the textual element in an image of the target scene or add the translated textual element to the textual element in the image; and
        display the image of the target scene comprising at least one of the substituted or added translated textual element to a user wearing the glasses; and
    an audio capture component that is voice-activated and is configured to:
        receive the audio input associated with the first language;
        translate the audio input into translated audio associated with the second language based at least in part on:
            hidden Markov model based speech synthesis;
            one or more pauses comprised within the audio input;
            a sentence structure associated with at least some of the audio input;
            a number of syllables of the audio input; and
            a second contextual hint determined based at least in part on the visual input; and
        play the translated audio to the user via a speaker.

2. The glasses of claim 1, the audio capture component comprising a microphone.

3. The glasses of claim 2, the speaker comprising an earphone operatively coupled to the glasses.

4. The glasses of claim 1, the speaker comprising an earphone operatively coupled to the glasses.

5. The glasses of claim 1, the visual rendering component configured to display the translated textual element at a location corresponding to the textual element in the received visual input.

6. The glasses of claim 1, at least some of at least one of the visual capture component, the visual analysis component, the text translator component, or and the visual rendering component implemented at least in part via a remote computing component operatively coupled to the glasses.

7. The glasses of claim 6, the remote computing component coupled to the glasses via a network.

8. The glasses of claim 1, the visual capture component configured to receive visual input from streaming media.

9. The glasses of claim 1, the audio capture component configured to capture audio input from a spoken communication.

10. The glasses of claim 1, the visual rendering component configured to display the translated textual element on a bottom of a display associated with the glasses.

11. A tangible computer-readable storage device comprising computer-executable instructions that when executed, perform a method comprising:
    determining at least one of a first language or a second language based at least in part on at least one of a selection by a user or a logic for automatically determining a language;
    receiving visual input of a target scene, the visual input originating from at least one of streaming video, a digital photograph or captured video;

analyzing, using neural network based optical character recognition, the visual input to identify one or more locations within the visual input that comprise a textual element associated with the first language;

translating the textual element into a translated textual element associated with the second language based at least in part on a first contextual hint determined based at least in part on an audio stream; and translating the audio stream into a translated audio stream associated with the second language based at least in part on:

hidden Markov model based speech synthesis;
 one or more pauses comprised within the audio stream;
 a sentence structure associated with at least some of the audio stream;
 a number of syllables of the audio stream; and
 a second contextual hint determined based at least in part on the visual input.

12. The tangible computer-readable storage device of claim 11, comprising translating the audio stream based at least in part on a transcribed audio segment.

13. The tangible computer-readable storage device of claim 12, at least one of the transcribed audio segment or the translated audio stream providing the first contextual hint.

14. The tangible computer-readable storage device of claim 11, the visual input associated with one or more file types.

15. The tangible computer-readable storage device of claim 11, the method performed by a kiosk-type device.

16. The tangible computer-readable storage device of claim 15, the kiosk-type device configured to scan a printed version of the digital photograph.

17. The tangible computer-readable storage device of claim 11, comprising:

substituting the translated textual element for the textual element in an image of the visual input.

18. A kiosk configured to perform a computer-implemented method, comprising:

determining at least one of a first language or a second language based at least in part on at least one of a selection by a user or a logic for automatically determining a language;

receiving visual input of a target scene, the visual input representative of a captured image of the target scene, the visual input originating from a printed picture that is scanned;

analyzing, using neural network based optical character recognition, the visual input to identify one or more locations within the visual input that comprise a textual element associated with the first language;

translating the textual element into a translated textual element associated with the second language based at least in part on a first contextual hint determined based at least in part on an audio stream; and translating the audio stream into a transcribed audio segment based at least in part on:

hidden Markov model based speech synthesis;
 one or more pauses comprised within the audio stream;
 a sentence structure associated with at least some of the audio stream;
 a number of syllables of the audio stream; and
 a second contextual hint determined based at least in part on the visual input.

19. The kiosk of claim 18, the method comprising scanning, by the kiosk, the digital picture.

20. The kiosk of claim 18, the method comprising receiving, by a microphone of the kiosk, the audio stream.

\* \* \* \* \*